Jan. 2, 1951      E. M. BUTLER      2,536,591
ELECTROLYTIC WATER CORRECTION DEVICE
Filed April 27, 1946
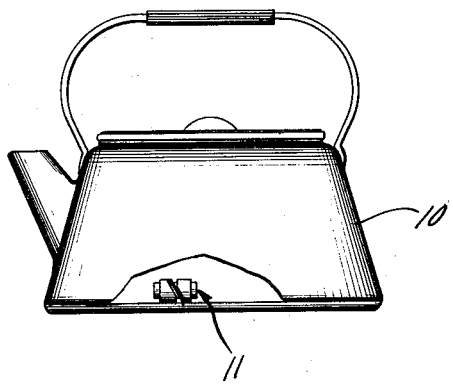
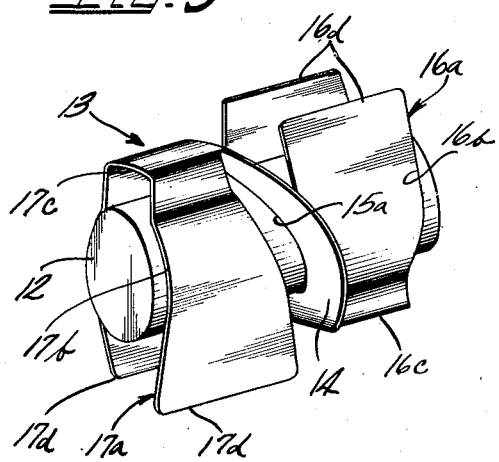
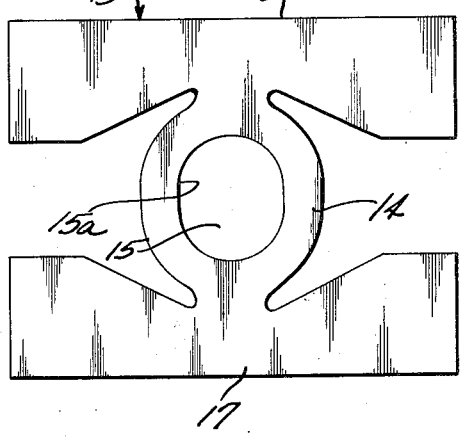
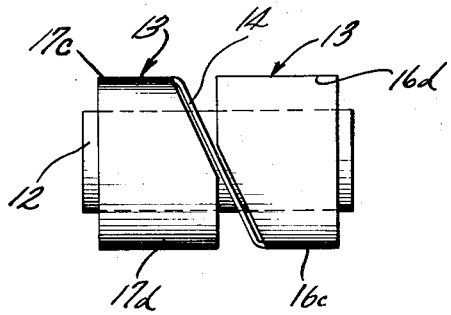
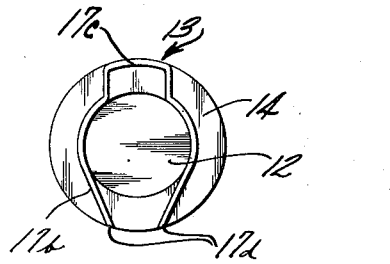
Inventor
EDGAR M. BUTLER
by The Firm of Charles Hill Attys.

Patented Jan. 2, 1951

2,536,591

UNITED STATES PATENT OFFICE 2,536,591

ELECTROLYTIC WATER CORRECTION DEVICE

Edgar M. Butler, New Orleans, La.

Application April 27, 1946, Serial No. 665,421

2 Claims. (Cl. 204—248)

This invention relates to an electrolytic water correction device, and more particularly to a device for use in hot water vessels of relatively small capacity, such as tea kettles, double boilers, and the hot water tanks of hot water systems in homes.

In vessels used for the heating of water in the home and in kitchens, such as in water kettles, tea kettles, the tanks of domestic hot water systems, and the like, a deposit or scale gradually builds up as the result of the precipitation of solids originally in solution in the water used. Where water is hard due to the presence of dissolved calcium or magnesium salts, a comparatively hard, adherent scale is formed in the bottom and occasionally upon the walls of the vessel in which the water is being heated. As a result of the formation of such scale, the rate of heat transfer through the wall of the vessel into the water being heated is greatly reduced, owing to the insulating effect of the scale. A great deal of heat may thus be wasted due to an inefficient rate of heat transfer.

In accordance with the principles of my present invention, I provide an electrolytic water correction device comprising a core of metal and a sheath or shield partially surrounding and engaged upon the core that is formed of a metal of different electro-motive potential so as to set up a galvanic action when the device is immersed in a water containing dissolved salt. If zinc is selected as the negative metal and copper, silver, or a silver-plated foundation metal as the positive metal, the result of the galvanic action is to liberate zinc ions into the water. The ions so liberated are immediately converted into zinc hydroxide or a hydrated zinc oxide, or else react with the calcium or magnesium ions that may be present in the water to precipitate them from solution. The result is that a relatively soft sludge, rather than a hard, adherent scale, is formed. The sludge can be flushed out periodically to leave relatively clean, uncorroded surfaces having a high rate of heat transfer efficiency.

In the case of relatively small capacity vessels, such as culinary vessels for the heating of water, the electrolytic water correction device should also be comparatively small and of a relatively simple inexpensive construction. In accordance with the principles of my present invention, I provide a water correction device formed of a central core, or cartridge, partially encased in a sheath, or shield, formed of sheet metal. The core may be of zinc or other suitable negative metal, and the sheath may be formed of any positive metal, such as copper, silver or the like, or of a copper- or silver-plated foundation metal. The sheath may suitably be formed from a sheet metal stamping having a central apertured portion for frictional engagement with the core, or cartridge, and having wing-like portions extending laterally from the core on either side of the central ring-like portion and resiliently engaging the core. The construction is such that upon consumption of the cartridge, or core, a new cartridge can be slipped in place in the former sheath.

The sheet metal sheath provides laterally extending portions, one of which is closed and the other of which is open, for resting upon the bottom of the vessel in which the device is placed. The resilient engagement of the core-gripping portions on the sheath establishes good electrical contact therebetween for the setting up of galvanic action.

It is therefore an important object of this invention to provide an electrolytic water correction device for use in vessels of small capacity for the heating of water to prevent the formation of a hard adherent scale on the inner walls of the vessel and also to reduce, or eliminate, corrosion of the metal of the walls due to the presence of dissolved oxygen in the water.

It is a further important object of this invention to provide an electrolytic water correction device of simple, inexpensive construction wherein the sheath, or shield, of positive metal is formed from a sheet metal stamping, so constructed and bent that upon being placed upon the cartridge of the negative metal it will frictionally and resiliently engage the same to make good electrical contact therebetween.

Other and further important objects of this invention will be apparent from the disclosures in the specification and on the accompanying drawings.

On the drawings:

Figure 1 is an elevational view of a tea kettle, broken away to illustrate the insertion thereinto of an electrolytic water correction device embodying the principles of my invention.

Figure 2 is a top plan view of a blank of sheet metal stamped into the form required to provide a shield, or sheath, of positive metal for the negative metal cartridge, when mounted thereon.

Figure 3 is a perspective view of the assembled device.

Figure 4 is a side elevational view of the same,

Figure 5 is an end elevational view of the same.

The reference numeral 10 indicates a tea kettle, or hot water kettle, of conventional design, having installed therein an electrolytic water correction device 11 embodying the principles of my present invention. Said device 11 comprises a core, or cartridge 12, which may suitably be in the form of a cylindrical bar, and a sheath, indicated generally by the reference numeral 13, for partially enclosing the cylindrical bar 12.

As illustrated in Figure 2, the sheath 13 may be pre-formed of a sheet metal stamping, cut out to provide a central annular portion 14 having a more or less elliptical opening 15, and diametrally opposed wing-like portions 16 and 17. Said portions 16 and 17, which are identical in configuration, are adapted to extend in opposite directions when the sheath is mounted upon the cylindrical bar 12 and to form resilient loops, or clips, such as the clips 16a and 17a (Fig. 3).

To pre-form the sheath 13 an arbor of smaller diameter than the bar 12 is inserted through the opening 15 and the wing-like portions 16 and 17 then bent in opposite directions, as illustrated in Figure 3. The bending of the wing-like portions 16 and 17 to form the loops or clips 16a and 17a causes a deflection of the annular portion 14 to bring the inner edge 15a, defining the opening 15, into frictional engagement with the outer surface of the arbor. At the same time, the wing-like portions 16 and 17 are bent around the arbor to resiliently engage the arbor along their broad faces, as at 17b and 16b. The loop-like, or clip-like, portions 16a and 17a thus have closed end portions, or bights, 16c and 17c, which are spaced from the arbor, and opened end portions 16d and 17d. The free edges of the end portions 16d and the closed end portions 17c lie on one side of the arbor, and the free ends 17d and the closed ends 16c lie on the opposite side of the arbor. Either set of closed and free ends provides a natural support for the device when resting on a bottom wall of a water vessel, or the like. In its assembled state, the annular intermediate portion 14 defines an elliptical opening, the edges of which tightly grip the core 12, and also defines an integral connection between the bights 16c and 17c of the looped end portions 16a and 17a.

The act of bending the blank 13 about a smaller diameter arbor than the bar 12 insures frictional engagement between the edge 15a and the outer surface of the bar 12 and resilient, gripping engagement between the broad faces of the wing portions 16a and 17a and the bar when the sheath 13 is assembled upon said bar 12. The sheath is thus held securely upon the bar 12 and is not likely to become displaced. At the same time, good electrical contact is made between the positive metal of the sheath and the negative metal of the core so as to set up a maximum amount of galvanic action when the device is installed in a water vessel, such at the water kettle 10.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. An electrolytic water correction device comprising a cylindrical core of an electronegative metal of the electromotive force series and an electropositive sheet metal shield of integral and resilient construction, said shield having an annular intermediate portion provided with an elliptical opening defined by edges that tightly grip said core and said shield having looped end portions connected at their bights to said intermediate portion, each of said looped end portions providing broad opposed surfaces resiliently engaging said core and having free terminal edges, the free edges of one end portion and the bight of the other end portion serving to support said device with said core in spaced relation to the supporting surface.

2. An electrolytic water correction device comprising a cylindrical core of an electronegative metal of the electromotive force series and an electropositive sheet metal shield of integral and resilient construction, said shield having an annular intermediate portion provided with an elliptical opening defined by edges that tightly grip said core and said shield having looped end portions connected at their bights to said intermediate portion, said bights being spaced from said core on opposite sides thereof and each of said looped end portions providing oppositely bowed broad surfaces resiliently engaging said core and having free terminal edges also spaced from said core, the free edges of one end portion and the bight of the other end portion serving to support said device with said core in spaced relation to the supporting surface.

EDGAR M. BUTLER.

REFERENCES CITED

The following references are of record in the file of this patent:

UNITED STATES PATENTS

| Number | Name | Date |
|---|---|---|
| 526,357 | Wells et al. | Sept. 18, 1894 |
| 598,028 | Smith et al. | Jan. 25, 1898 |
| 647,409 | Hudson et al. | Apr. 10, 1900 |
| 685,176 | Ross | Oct. 22, 1901 |
| 2,425,424 | Jones | Aug. 12, 1947 |
| 2,451,065 | Butler | Oct. 12, 1948 |